United States Patent [19]

McCain et al.

[11] Patent Number: 5,981,623

[45] Date of Patent: Nov. 9, 1999

[54] INK JET INK CONTAINING WETTING AGENT

[75] Inventors: Sandra Helton McCain; Terence Edward Franey; Ashok Vishnu Gangal; Agnes Kam Zimmer, all of Lexington, Ky.

[73] Assignee: Lexmark International, Inc., Lexington, Ky.

[21] Appl. No.: 08/827,138

[22] Filed: Mar. 27, 1997

[51] Int. Cl.$^6$ .......................... C09D 11/00; C09D 11/02; C09D 183/05; C09D 183/06

[52] U.S. Cl. .................. 523/160; 106/31.27; 106/31.33; 106/31.43; 106/31.57

[58] Field of Search ...................... 523/160, 161; 106/31.13, 31.27, 31.29, 31.32, 31.33, 31.43, 31.57

[56] References Cited

U.S. PATENT DOCUMENTS

| | | |
|---|---|---|
| 4,059,606 | 11/1977 | Walsingham et al. .................. 556/444 |
| 4,585,484 | 4/1986 | Haruta et al. . |
| 4,822,419 | 4/1989 | Pepoy et al. . |
| 4,973,499 | 11/1990 | Iwata et al. . |
| 4,994,110 | 2/1991 | Stoffel et al. . |
| 5,006,862 | 4/1991 | Adamic . |
| 5,026,425 | 6/1991 | Hindagolla et al. . |
| 5,108,503 | 4/1992 | Hindagolla et al. . |
| 5,129,948 | 7/1992 | Breton et al. ........................ 106/31.43 |
| 5,141,556 | 8/1992 | Matrick ................................... 524/385 |
| 5,156,675 | 10/1992 | Breton et al. ........................ 106/31.43 |
| 5,198,023 | 3/1993 | Stoffel . |
| 5,211,747 | 5/1993 | Breton et al. . |
| 5,224,987 | 7/1993 | Matrick . |
| 5,286,286 | 2/1994 | Winnik et al. ....................... 106/31.15 |
| 5,348,989 | 9/1994 | Shiraishi ................................. 523/161 |
| 5,364,461 | 11/1994 | Beach et al. . |
| 5,395,431 | 3/1995 | Siddiqui et al. . |
| 5,431,724 | 7/1995 | Adamic et al. . |
| 5,531,815 | 7/1996 | Gundlach et al. ................... 106/31.43 |
| 5,536,306 | 7/1996 | Johnson et al. . |
| 5,562,762 | 10/1996 | Mrvos et al. . |
| 5,589,522 | 12/1996 | Beach et al. . |
| 5,686,519 | 11/1997 | Loftin et al. ........................... 524/462 |
| 5,726,690 | 3/1998 | Bohoquez et al. ....................... 347/15 |

*Primary Examiner*—Vasu Jagannathan
*Assistant Examiner*—Callie E. Shosho
*Attorney, Agent, or Firm*—John A. Brady

[57] ABSTRACT

A jet printing ink composition which results in reduced drop misdirection and missing nozzles is provided. The aqueous-based ink composition includes at least one colorant; a wetting agent; and a co-solvent comprising a substituted or unsubstituted lactam, an amide, or mixtures thereof.

17 Claims, No Drawings

INK JET INK CONTAINING WETTING AGENT

FIELD OF INVENTION

This invention relates to an aqueous ink composition, and more particularly to aqueous inks adapted to be applied to a substrate from nozzles, commonly known as ink jet inks.

BACKGROUND OF THE INVENTION

Ink jet printers offer low cost and high quality printing options for a number of end uses including providing printed output from individual or networked computers. Typically, the printhead of an ink jet printer employs a resistor element in a chamber which is provided with a source of liquid ink from, for example, a reservoir such as an ink cartridge. Multiple resistor elements are arranged in a desired pattern on a nozzle plate to form the printhead, with each resistor element associated with a nozzle on the nozzle plate through which ink drops are expelled toward a print substrate.

In operation, a microprocessor controls signals sent to each resistor causing selected elements to be heated at appropriate times. This heating causes a bubble of ink to form in the chamber. The buildup of pressure expels the ink through the nozzle. By controlling the firing of the resistors, alphanumeric characters may be formed by the ink drops which strike the print substrate.

Ink jet inks are known to have stringent performance requirements including the need for a long shelf life, the ability not to dry and clog the nozzles when in the printhead, and yet also having the capability to dry quickly once printed onto paper or other substrates. As ink jet printing has advanced to achieve higher resolutions (i.e., more ink drops per inch) and higher print quality, the performance requirements for the jet inks have become even more critical. That is, the ink jet printer must be able to deliver a lower drop mass (i.e., smaller diameter drops) through a smaller diameter nozzle accurately and at a high frequency. Accordingly, there remains a need in the art for ink jet inks capable of providing high print quality at high resolution and speed.

SUMMARY OF THE INVENTION

The present invention meets that need by providing a jet printing ink composition which results in reduced drop misdirection and missing nozzles. In accordance with one aspect of the invention, an ink composition is provided and includes at least one colorant; co-solvents such as, for example, a substituted or unsubstituted lactam, an amide, or mixtures thereof; a penetrant, and a wetting agent comprising hydrophobic and hydrophilic segments. Preferably the lactam co-solvent comprises 2-pyrrolidone and the wetting agent is an alkoxypolyalkyleneoxyalkanol such as, for example, an alkyloxyethyleneoxyethanol or a polyorganosiloxane having the general formula

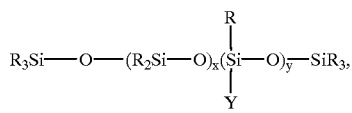

where each R is independently a $C_{1-6}$ alkyl group, an aryl group, but preferably methyl, Y is A—$(OCR_2—CR_2)_m$—$(OCR_2—CR_2)_n$—Z, and Z is H, OH, or an alkoxy group such as, for example, $OCH_3$, m, x, and y are each independently integers $\geq 1$, n is an integer $\geq 0$, and A is a bridging radical such as, for example, $(CR_2)_n$. The ink provides high print quality at high resolution and speed.

DETAILED DESCRIPTION OF THE PREFERRED EMBODIMENT

The liquid ink composition of the present invention provides a jet printing ink which affords high quality printing even when using reduced mass droplets of ink expelled from small diameter nozzles at high frequencies. The ink composition includes, as important components, a colorant, a co-solvent, and a wetting agent. The term wetting agent as used herein means a compound having hydrophobic and hydrophilic segments, and includes surfactants, gas bubble destabilizing agents, and anti-foaming agents. In a further preferred embodiment, the ink composition also includes a penetrant, and the composition is aqueous-based.

Ink jet printers which are designed to deliver high resolution printing include printheads having nozzle plates with nozzles having diameters of less than about 40 μm, preferably less than about 35 μm, and most preferably less than about 30 μm. Such small diameter nozzles deliver ink droplets of reduced mass, in the range of from about 15 to about 25 nanograms per droplet.

With the use of such small diameter nozzles and reduced mass ink droplets, the performance requirements for the inks which are used are very stringent. Problems such as misdirection and missing nozzles can occur, partly due to the lower kinetic energy of the smaller ink droplets. By "misdirection", it is meant that the ink droplets do not travel in their designed perpendicular trajectory from the nozzles. By "missing nozzles", it is meant that a nozzle does not "fire" expelling an ink droplet when it is supposed to do so or is blocked so that no ink droplet can be expelled.

While not wishing to be bound by any particular theory, misdirection and missing nozzles may be caused, at least in part, by differences in the surface energy of a nozzle plate. Uneven wetting of the nozzle plate by the ink may cause puddling of the ink around the edges of one or more nozzles. The puddled ink interferes with the trajectory of the ink droplets beings expelled from the nozzles and causes such droplets to be misdirected off of their designed perpendicular path. Misdirection also becomes a greater problem with lower momentum ink drops (i.e., ink drops having either or both reduced mass or reduced velocity). Further, if puddling of the ink becomes heavy during high coverage printing periods, such ink puddles may cause missing nozzles by preventing the subsequent ink drops from being ejected from the printhead.

Misdirection and missing nozzles may also be caused, at least in part, due to gas bubbles in the individual firing chambers of the printhead. Dissolved gases in the ink are evolved when the temperature of the ink is heated during continuous firing. As gases are less soluble in the ink at such higher temperatures, the resultant gas bubbles may interfere with or even completely block subsequent firings.

The present invention employs an alkyloxypolyalkyleneoxyalkanol and/or a polyorganosiloxane wetting agent in the ink composition which functions both to impart a high wettability to the ink as well as to destabilize undesired ink bubble formation in the firing chambers in the printhead. That is, the wetting agent acts to reduce the surface tension of the ink so that a more uniform surface energy on the surface of the nozzle plate is achieved. This action has been observed to minimize puddling of the ink on the surface of the nozzle plate. Additionally, the wetting agent acts both to reduce bubble formation from the evolution of dissolved gases in the ink at the high temperatures encountered by the ink in the firing chambers as well as to destabilize those bubbles which do form.

Moreover, it has been further unexpectedly found that the use of the wetting agent in the ink composition of the present invention permits the amount of penetrant used in the composition to be reduced, if in fact a penetrant is desired. Thus, less penetrant may be used and yet still achieve desirable prevention of intercolor bleed on the printed substrate while providing for rapid ink drying.

In a preferred embodiment of the invention the liquid ink formulation includes the following components:

| INGREDIENT | FUNCTION | WEIGHT % |
| --- | --- | --- |
| Dye/Pigment | Colorant | 1–4% |
| EDTA | Chelating agent | 0–0.1% |
| 2-pyrrolidone | Humectant/co-solvent | 4–11% |
| tetraethylene glycol | Humectant/co-solvent | 8–17% |
| 1,2 hexanediol | Penetrant | 3–6% |
| polyorganosiloxane | Wetting agent | 0.1–10% |
| 1,2-benz-isothiazolin-3-one | Biocide | 0–0.3% |
| sodium borate | Buffer | 0–0.75% |

The ink preferably has a static surface tension of <about 45 dynes/cm$^2$.

COLORANT

Colorants useful in the present invention include both pigment dispersions or dyes. As is known in the art, a pigment dispersion is a mixture of a pigment and a dispersing agent, typically a polymeric dispersant compound. Pigments which may be utilized in the practice of the present invention include essentially any of the classes of pigments heretofore used in this art including azo pigments, polycyclic pigments, basic and acid dye lakes, and organic and inorganic pigments.

Dyes which are commonly used in ink jet inks such as, for example, Acid, Direct, Food, and Reactive dyes are all suitable for use as colorants in the present invention. In a preferred embodiment of the invention which utilizes a cyan/magenta/yellow color combination for a multicolor ink jet system, the colorants comprise Direct Blue 199 as the Cyan component, Lexmark 93A (trademark) as the Magenta component (described in Beach et al, U.S. Pat. No. 5,254,160), and Acid Yellow 23 as the Yellow component. However, essentially any other dyes which permit the formation of colored visible images on a recording medium may be used, including anthraquinones, mono- and di-azo dyes, phthalocyanines, and formazan copper complexes. Specific dyes include Food Black No. 2, Direct Black 168, Acid Blue 9, Acid Red 249, Reactive Black 31, Direct Black 154, Reactive Red 180, Direct Blue 86, and Direct Yellow 132.

The amount of colorant in the ink composition may be varied depending on a number of factors, but the colorant is commonly present in an amount of from between about 1 to about 10% by weight, and more preferably from about 1 to about 4% by weight (based on total weight of the ink), including all ranges subsumed therein.

CO-SOLVENT

The balance of the ink composition of this invention is not limited. Thus, the ink may be aqueous or non-aqueous. To aid in maintaining the colorant in solution and enhance ink performance, however, a co-solvent is present in the ink composition. Generally, water soluble organic agents such as polyhydric alcohols are suitable and include ethylene glycol, propylene glycol, butylene glycol, diethylene glycol, triethylene glycol, hexylene glycol, 1,2,6-hexanetriol, and thiodiglycol. Other suitable co-solvents for the composition include diols, glycolesters, glycerol, polyalkyl glycols such as polyethylene glycol, and lower alkyl ethers of polyhydric alcohols. Yet other suitable co-solvents include alcohols, ketones such as acetone, ethers such as tetrahydrofuran and dioxane, esters such as ethyl acetate, sulfolanes, N-methyl pyrrolidone, lactones such as y-butyrolactone, and the above-mentioned substituted or unsubstituted lactams having the general formula:

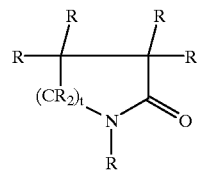

where, R is H, $C_{1-6}$ alkyl, aryl, or halogen and t is an integer from 1 to 3. Examples of suitable substituted or unsubstituted lactams include 2-pyrrolidone, 1-methyl 2-pyrrolidone, and N-(2-hydroxyethyl)-2-pyrrolidone. Of course, compatible blends and mixtures of any of the above compounds may also be utilized. Co-solvents also perform the function of humectants in the composition to prevent the ink from drying out in the printhead.

Co-solvents may also include 1°, 2°, and 3° amides either alone or in a mixture with any of the above-mentioned co-solvents. Suitable amide co-solvents include those having the general formula

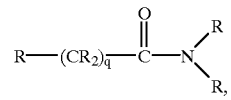

where R is as previously defined and q is an integer between 0 and 6.

Co-solvents are typically present in an amount of from between about 5 to about 30% by weight, and more preferably from about 12 to about 28% by weight, including all ranges subsumed therein. As will be appreciated, the amounts of co-solvent will be dependent in part on the other components of the ink. Preferred co-solvents for use in the present invention include a compatible mixture of a lactam such as 2-pyrrolidone (2 to 50%, and preferably 4–15% by weight) and tetraethylene glycol (8–17% by weight).

It has been unexpectedly found that the co-solvents and the wetting agents described above in combination act to provide an ink which has fewer misdirected jets and missing nozzles.

PENETRANT

When penetrants (which include surfactants) are preferred for use in the invention, they are added to the ink compositions to improve penetration by the ink drops into the surface of the printed substrate and to reduce or eliminate intercolor bleeding (i.e., lateral bleeding of color). Preferred penetrants for use in the present invention include 1,2 alkyl diols containing from 4 to 10 carbon atoms in the alkyl group such as those taught in commonly-assigned Beach et al, U.S. Pat. No. 5,364,461. Most preferred are 1,2-hexanediol and 1,2-pentanediol. In a preferred embodiment, the penetrant is present in the ink composition in an amount of from between about 3 to about 6% by weight.

Surprisingly, it has been found that a lower concentration of penetrant may be used in the ink composition of the present invention and still attain reduced intercolor bleed. While not wishing to be bound by any particular theory, it is believed that the wetting agents described above, in synergistic combination with the penetrant, provide reduced color bleed at lower penetrant concentrations in the ink than would otherwise be necessary.

WETTING AGENT

To reduce ink drop misdirection and missing nozzles, the ink of the present invention also includes a wetting agent comprising an alkyloxypolyalkyleneoxyalkanol and/or a polyorganosiloxane. Specifically, a preferred class of polyorganosiloxane agents are those polyalkylene oxide-modified polyorganosiloxane copolymers having the general formula:

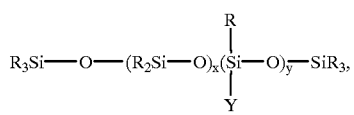

where R is methyl, Y is $-(CH_2)_3-(OCH_2-CH_2)_m-(OCH_2-CH_2-CH_2)_n-Z$, and Z is H or $OCH_3$, m, x, and y are integers $\geq 1$ and n is an integer $\geq 0$. This class of polyalkylene oxide-modified polyorganosiloxane copolymers is commercially available and a most preferred composition has the formula:

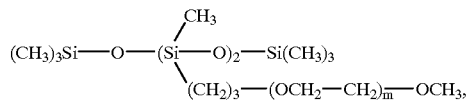

where m is an integer $\geq 1$. The wetting agent is present in the ink composition in an amount of from about 0.1 to about 10.0% by weight of the ink composition, and preferably from about 0.1 to about 1.0 by weight, including all ranges subsumed therein.

OTHER OPTIONAL COMPONENTS

The ink composition of the present invention may also include other desirable components which have heretofore been included in jet printing ink compositions including chelating agents, biocides, viscosity modifiers, and buffers. Chelating agents such as ethylene diamine tetraacetate (EDTA) may be added to prevent any deleterious effects from metal or alkali metal ion contaminants or impurities. Typically, a chelating agent may be added to the composition in an amount of from about 0.1 to about 1.0% by weight.

Biocides, such as for example, 1,2-benz-isothiazolin-3-one, may be added to the ink to prevent or inhibit growth of microorganisms in the ink. Generally, the addition of from about 0.1 to about 0.3% by weight of a biocide will be efficacious.

Buffering agents such as sodium borate may also be added to adjust or maintain a desired pH for the ink. As will be appreciated, the amount of buffer will depend on the other components in the ink. However, it has been found that the addition of small amounts of buffer to the ink, such as from about 0.25 to about 0.75% by weight, are useful.

INK PREPARATION

The inks of the present invention may be prepared by essentially any process for preparing aqueous-based inks. A preferred procedure for preparing an illustrative ink is as follows: The dye, chelating agent (EDTA), and deionized water are mixed together with stirring for approximately 20 minutes. Then the following components are added in sequence, with approximately 15–20 minutes of stirring following the addition of each component—lactam co-solvent; tetraethylene glycol co-solvent; 1,2-hexanediol penetrant; biocide; sodium borate buffer; and polyalkylene oxide-modified polyorganosiloxane. All of the mixing steps may be carried out at ambient temperature.

Once all of the components have been added and thoroughly mixed, the pH of the ink is measured and adjusted to a pH of 7.2. The ink composition is then filtered to remove any solid or particulate matter.

In order that the invention may be more readily understood, reference is made to the following examples, which are intended to be illustrative of the invention, but are not intended to be limiting in scope.

COMPARATIVE EXAMPLES 1, 2, AND 3

Three ink formulations were prepared and contained the components as listed below. None of the Comparative Example inks contained 2-pyrrolidone or a polyoxyalkylene-modified polyorganosiloxane.

Example 1

| Component | Wt. % |
|---|---|
| Direct Blue 199 | 2.25 |
| EDTA | .01 |
| tetraethylene glycol | 20.0 |
| 1,2-hexanediol | 6.0 |
| 1,2-benz-isothiazolin-3-one | 0.2 |
| sodium borate | 0.5 |
| DI water | balance |

Example 2

| Component | Wt. % |
|---|---|
| Magenta 93A | 2.25 |
| EDTA | .01 |
| tetraethylene glycol | 20.0 |
| 1,2-hexanediol | 6.5 |
| 1,2-benz-isothiazolin-3-one | 0.2 |
| sodium borate | 0.5 |
| DI water | balance |

Example 3

| Component | Wt. % |
|---|---|
| Direct Yellow 132 | 2.00 |
| EDTA | .01 |
| tetraethylene glycol | 20.0 |
| 1,2-hexanediol | 7.0 |
| 1,2-benz-isothiazolin-3-one | 0.2 |
| sodium borate | 0.5 |
| DI water | balance |

EXAMPLE 4, 5, AND 6

Three ink formulations in accordance with the present invention were prepared and contained the components listed below.

Example 4

| Component | Wt. % |
| --- | --- |
| Direct Blue 199 | 3.00 |
| EDTA | .01 |
| 2-pyrrolidone | 7.5 |
| tetraethylene glycol | 12.5 |
| 1,2-hexanediol | 4.0 |
| 1,2-benz-isothiazolin-3-one | 0.2 |
| sodium borate | 0.2 |
| polyorganosiloxane[1] | 0.5 |
| DI water | balance |

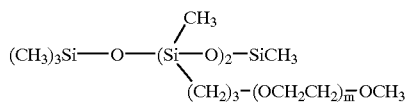

Example 5

| Component | Wt. % |
| --- | --- |
| Magenta 93A[2] | 3.00 |
| EDTA | .01 |
| 2-pyrrolidone | 7.5 |
| tetraethylene glycol | 12.5 |
| 1,2-hexanediol | 4.0 |
| 1,2-benz-isothiazolin-3-one | 0.2 |
| sodium borate | 0.2 |
| polyorganosiloxane[3] | 0.5 |
| DI water | balance |

[2]U.S. Pat. No. 5,254,160

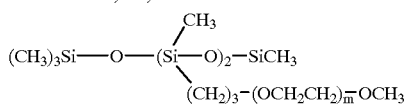

Example 6

| Component | Wt. % |
| --- | --- |
| Acid Yellow 23 | 3.25 |
| EDTA | .01 |
| 2-pyrrolidone | 7.5 |
| tetraethylene glycol | 12.5 |
| 1,2-hexanediol | 4.0 |
| 1,2-benz-isothiazolin-3-one | 0.2 |
| sodium borate | 0.2 |
| polyorganosiloxane[4] | 0.5 |
| DI water | balance |

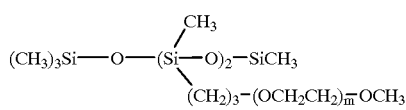

Example 7

| Component | Wt. % |
| --- | --- |
| Acid Yellow 23 | 3.25 |
| EDTA | .01 |
| 2-pyrrolidone | 7.5 |
| tetraethylene glycol | 12.5 |
| 1,2-hexanediol | 4.0 |

-continued

| Component | Wt. % |
| --- | --- |
| 1,2-benz-isothiazolin-3-one | 0.2 |
| sodium borate | 0.2 |
| alkyloxypolyethyleneoxyethanol | 0.5 |
| DI water | balance |

Example 8

The Comparative Example inks and the inks of the present invention were run through a high resolution tricolor ink jet printer having a printhead containing multiple nozzles. Three tests were run using the inks of Comparative Exs. 1, 2, and 3, and the results of the tests averaged. Two tests were run using the inks of the present invention (namely, Exs. 4, 5, and 6), and the results were again averaged. The ink drops which were expelled from the printhead nozzles were observed for misdirection and missing (i.e., blocked or no drop expelled) nozzles with the following results:

| Ink | # Missing Nozzles | # Misdirected |
| --- | --- | --- |
| Comparative Test 1 | 6 | 7 |
| Comparative Test 2 | 3 | 2 |
| Comparative Test 3 | 5 | 5 |
| Average | 4.7 | 4.7 |
| Test 1 | 0 | 0 |
| Test 2 | 0 | 0 |
| Average | 0 | 0 |

As can be seen, the ink of the present invention produced no misdirected or missing nozzles in either test, while the comparative ink compositions had a significant number of misdirected and missing nozzles in each test. Also, the observed amount of flooding of the nozzle plate surface was less with the ink of the present invention, permitting this ink to operate at a higher frequency (i.e., fire in more rapid succession) than with previous inks.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An ink composition comprising: at least one colorant; a polyorganosiloxane wetting agent having the structure

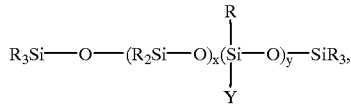

where each R is independently a $C_{1-6}$ alkyl group, or an aryl group, Y is $A-(OCR_2-CR_2)_m-(OCR_2-CR_2-CR_2)_n-Z$, and Z is H, OH, or an alkoxy group, m, x, and y are each independently integers $\geq 1$, n is an integer $\geq 0$, and A is a bridging radical; and a co-solvent comprising a substituted or unsubstituted lactam.

2. An ink composition as claimed in claim 1 including a second co-solvent for said colorant.

3. An ink composition as claimed in claim 1 further including a penetrant.

4. An ink composition as claimed in claim 3 in which said penetrant comprises a 1,2-alkyl diol of from 4 to 10 carbons atoms forming said alkyl group.

5. An ink composition as claimed in claim 1 including a humectant.

6. An ink composition as claimed in claim 1 in which said colorant comprises a water soluble dye and said ink composition further comprises water.

7. An ink composition as claimed in claim 1 in which said lactam is 2-pyrrolidone.

8. An ink composition comprising at least one colorant comprising from about 1 to about 10% by weight of a water soluble dye; a co-solvent comprising from about 4 to about 15% by weight of a substituted or unsubstituted lactam; a penetrant comprising from about 3 to about 6% by weight of a 1,2-alkyl diol of from 4 to 10 carbons atoms forming said alkyl; and from about 0.1 to about 10% by weight of a polyorganosiloxane wetting agent having the structure

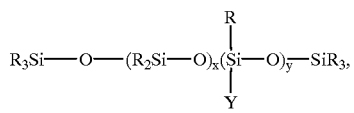

where each R is independently a $C_{1-6}$ alkyl group, or an aryl group, Y is A—$(OCR_2$—$CR_2)_m$—$(OCR_2$—$CR_2$—$CR_2)_n$—Z, and Z is H, OH, or an alkoxy group, m, x, and y are each independently integers $\geq 1$, n is an integer $\geq 0$, and A is a bridging radical.

9. An ink composition as claimed in claim 8 including a second co-solvent comprising from about 8 to about 17% by weight tetraethylene glycol.

10. An ink composition as claimed in claim 8 in which said lactam is 2-pyrrolidone.

11. An ink composition as claimed in claim 8 in which said 1,2-alkyl diol is 1,2-hexane diol.

12. An ink composition as claimed in claim 8 in which said polyorganosiloxane wetting agent has the formula

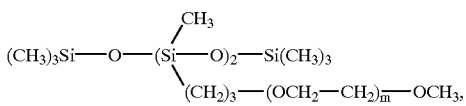

where m is an integer $\geq 1$.

13. A process for printing a liquid ink from a series of nozzles onto a substrate comprising the steps of providing an ink composition comprising at least one colorant, a polyorganosiloxane wetting agent having the structure

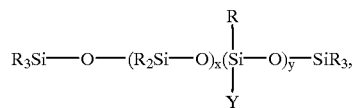

where each R is independently a $C_{1-6}$ alkyl group, or an aryl group, Y is A—$(OCR_2$—$CR_2)_m$—$(OCR_2$—$CR_2$—$CR_2)_n$—Z, and Z is H, OH, or an alkoxy group, m, x, and y are each independently integers $\geq 1$, n is an integer $\geq 0$, and A is a bridging radical; and a co-solvent comprising a substituted or unsubstituted lactam; forming individual ink drops by heating said ink to form ink bubbles; and expelling said ink drops from said nozzles, whereby misdirection and missing nozzles are reduced.

14. A process as claimed in claim 13 in which said nozzles have a diameter of less than about 40 μm.

15. A process as claimed in claim 13 in which said nozzles have a diameter of less than about 30 μm.

16. A process as claimed in claim 13 in which said individual ink drops have a mass of from between about 15 to about 25 nanograms.

17. A process as claimed in claim 13 in which said lactam is 2-pyrrolidone.

* * * * *